United States Patent [19]

Brooks et al.

[11] Patent Number: 4,555,617
[45] Date of Patent: Nov. 26, 1985

[54] CONCURRENT, IMAGE-BASED, REJECT-RE-ENTRY REPAIR SYSTEM AND METHOD

[75] Inventors: Ralf M. Brooks; Daniel A. Lepic, both of Waterloo, Canada

[73] Assignee: NCR Canada Ltd.-NCR Canada Ltee, Mississauga, Canada

[21] Appl. No.: 452,524

[22] Filed: Dec. 23, 1982

[51] Int. Cl.[4] .......................................... G06F 15/30
[52] U.S. Cl. .................................... 235/379; 235/449
[58] Field of Search ................ 235/379, 449; 209/534; 364/900

[56] References Cited

U.S. PATENT DOCUMENTS

| | | | |
|---|---|---|---|
| 3,949,363 | 4/1976 | Holm | 340/146.3 D |
| 3,988,571 | 10/1976 | Blair et al. | 235/61.9 R |
| 4,027,142 | 5/1977 | Paup et al. | 235/61.9 R |
| 4,201,978 | 5/1980 | Nally | 340/146.3 C |
| 4,205,780 | 6/1980 | Burns et al. | 235/454 |
| 4,264,808 | 4/1981 | Owens et al. | 235/379 |
| 4,404,649 | 9/1983 | Nunley | 235/379 |

Primary Examiner—Harold I. Pitts
Attorney, Agent, or Firm—Albert L. Sessler, Jr.; Elmer Wargo

[57] ABSTRACT

A method and system for processing a batch of documents such as checks for achieving concurrent, reject re-entry and repair of rejects of the batch of documents in association with a sorting machine. A document reader such as a MICR reader for example, and an imaging apparatus are included along the document track to generate MICR data and digitized image data for each document passing thereby. A document whose MICR data is read correctly is routinely sorted while a document whose MICR data for a field is missing, for example, is sorted in a reject pocket. The data needed to complete the missing field is obtained by an operator viewing an image of the document on a data entry terminal while the associated document which was sorted in the reject pocket is stored at an encoder coupled to the reject pocket. The now-complete data obtained by the operator is used by the encoder to print the now-complete data for the missing field on the associated document.

14 Claims, 10 Drawing Figures

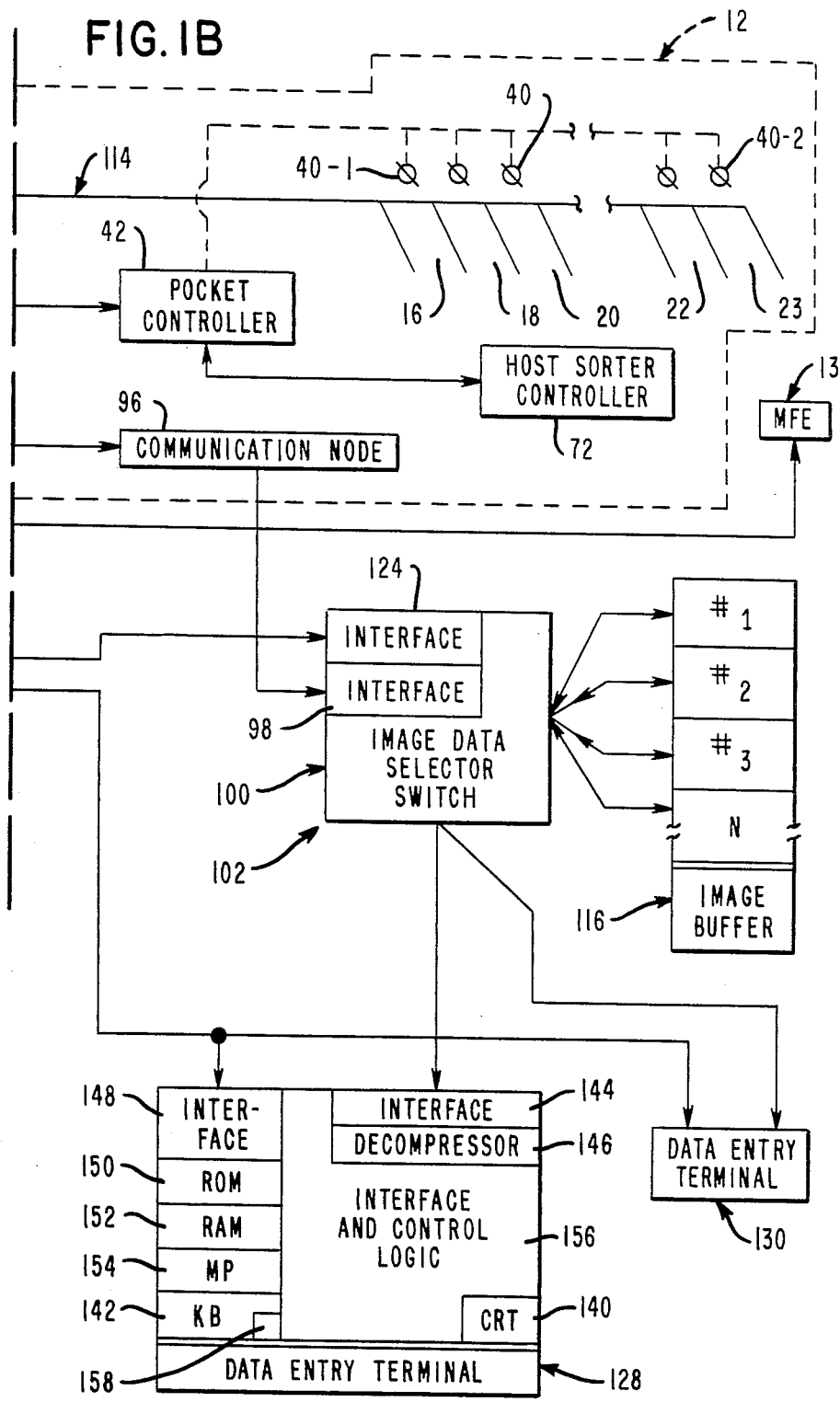

4,555,617

CONCURRENT, IMAGE-BASED, REJECT-RE-ENTRY REPAIR SYSTEM AND METHOD

BACKGROUND OF THE INVENTION

This invention relates to a banking method and system for processing documents and more particularly, for achieving concurrent, reject-re-entry and repair of sorter rejects of documents such as checks in association with a sorting machine.

The documents such as checks which are used currently in banking systems have certain data such as individual account numbers, bank routing numbers etc., printed thereon in magnetic ink, and this data is commonly referred to as magnetic ink character recognition or MICR data. When a check is received at a bank for processing, the monetary amount of a typical check is written, for example, by a customer in plain or nonmagnetic ink. Part of the general, routine processing of a check requires that the monetary amount of the check be printed thereon in magnetic ink, thereby making it part of the MICR data on the check.

Generally, such typical checks are processed in "batches" of checks with about 200–300 checks being in each batch. Certain accounting or banking operations are performed on a "batch" of such checks. For example, after the checks have the associated monetary amounts printed thereon in MICR ink, the batch of checks may be run through a banking machine such as a check sorter, to sort the checks and to obtain a total monetary amount of all the checks included in that batch of checks. This batch total may be used in subsequent batch operations as a check of the accuracy of those operations.

Continuing with the example of banking operations performed on a check sorter, there are generally two classes of documents processed by these check sorters in a typical installation, namely:
1. Over-the-counter items, and
2. Inclearings.

The over-the-counter items are the items like checks, deposit slips, etc. arising from transactions conducted at the processing bank itself or at its branches. These items are proven and encoded in batches, for example, as previously explained and are then processed by a sorter which is also typically referred to as a reader/sorter. The processing which includes data capture for the creation of "cash letters" etc. generally includes the sorting of documents by passing the documents through the sorter several times or passes depending on different sorting criteria, the number of "sorting pockets" in the particular sorter used, and the particular sorting algorithm associated with the sorter's processing system. Generally, with over-the-counter items, the first or prime pass on the sorter is used to separate the "On-Us" documents from the "Transit" documents, with the On-Us documents being drawn on the processing bank and with the Transit documents being drawn on other banks. Other passes may be used to single out Deposits, Cash In/Out Tickets, for example.

Basically, the documents in the Inclearings class are all "On-Us" documents which have been received from "other banks" or clearing facilities, and generally, the only processing activity required on the sorter is the capture of the MICR data, for example, for use in updating and sorting the documents to the individual customer accounts. While this explanation has proceeded with a discussion of MICR data, the reader/sorter mentioned may also have an optical character recognition (OCR) reader associated therewith to also machine-read the data thereon. The capture of the MICR and/or OCR data is used for the updating and sorting of the documents mentioned.

During the activities mentioned on the reader/sorter, some of the documents cannot be interpreted due to poor encoding or printing, dirt, folding, etc.; and others may have an entire field such as the monetary amount field missing, and consequently, these unreadable documents and documents having missing fields are sorted into a reject pocket. Those documents which are read properly are sorted into the various pockets of the sorter according to a particular application program or set of routing instructions in effect at the time of sorting. Those documents which lie in the reject pocket generally have to be processed manually to extract the necessary information from the documents and thereafter merge this information into the associated data capture files. The process of manually completing information extraction from the rejected documents, the merging of this extracted information into the proper or associated data capture file, the reconciling of any outstanding balance conditions caused by the rejected documents, and the physical re-entering of the rejected documents back into the associated document processing stream is referred to as REJECT RE-ENTRY.

In a typical, prior art, re-entry system the documents which are rejected at a sorter due to a misread or a missing field, for example, are manually taken to a separate "reject-re-entry transport and console" where data re-entry is effected.

At the re-entry transport/console, data reentry is effected by an operator who visually observes the physical document and enters the needed data on a keyboard to complete it. In some re-entry procedures, the associated console contains MICR/OCR readers to attempt to automatically re-read the document and thereby minimize the amount of data to be manually entered, thereby facilitating the overall re-entry operation. If the re-entry procedure is not on line, the re-entered data is stored in a local memory device, and later, it is transferred or merged into the main data file. If the system is on-line, the re-entered data is immediately merged into the main data file. In some on-line systems, the associated data processor sometimes sends the keyboard operator location or pointer clues to facilitate isolating the rejected character or characters while the operator is looking at the physical document to facilitate the manual re-entry of data.

In some prior art systems, a bar code is printed or encoded on the back of each document passing through the sorter during the first or prime run; sometimes the bar code is placed on the backs of only the rejected documents during re-entry processing. This bar code is used as a unique identifier and serves as a basis for physical re-entry of the rejected documents back into the main document stream.

SUMMARY OF THE INVENTION

The document re-entry and repair system of this invention, in its broadest form, comprises: a reader/sorter having a reject area into which rejected documents are fed; and means for encoding data on said rejected documents, with said means for encoding data being coupled to said reject area to receive said rejected documents from said reject area as they are fed into said reject area by said reader/sorter.

The method of this invention of processing and repairing a missing data field on documents comprises the steps of: (1) moving the documents along a track in reading relationship with a means for reading documents to determine which of said documents has a said missing data field; (2) diverting said documents having a said missing data field thereon into a reject area; (3) developing data for said missing data field to produce completed data for each of said documents diverted into said reject area without using said diverted documents; (4) locating an encoder adjacent to said reject area for receiving said documents as they are diverted into said reject area in said diverting step; (5) encoding the corresponding completed data for each said document at said encoder as obtained from said developing step.

The advantages of this invention are as follows:

1. The system is on-line and concurrent. The use of images of the documents for data re-entry minimizes time-consuming document handling. The images of the documents are captured on the first pass through the sorter. Physical repair of certain fields on the rejected documents is accomplished by a means for encoding data on the rejected documents with the means for encoding being located adjacent to the reject area.

2. A low cost encoder for printing the data in the fields being repaired may be used.

3. This invention may be added to a conventional sorter as an "add-on" feature.

4. These advantages and others will be more readily understood in connection with the following specification, claims, and drawing.

BRIEF DESCRIPTION OF THE DRAWING

FIGS. 1A and 1B, taken together, show a schematic view, in block form, of a system which depicts a preferred embodiment of this invention;

DETAILED DESCRIPTION OF THE INVENTION

Figure 1A:
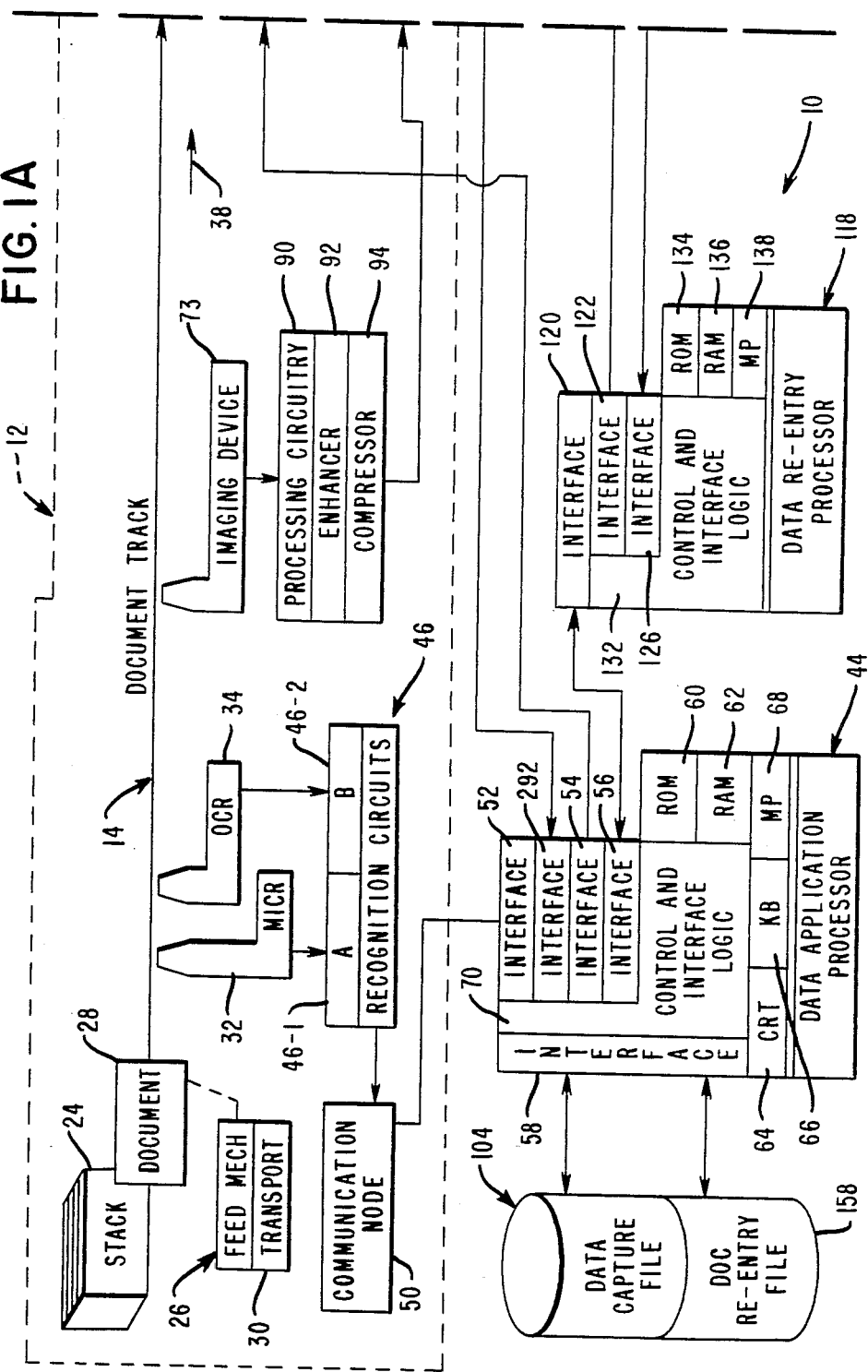

FIGS. 1A and 1B, taken together, show a preferred embodiment of an on-line, concurrent, image-based, sorter-reject, re-entry and repair system of this invention which is referred to hereinafter as system 10. The system 10 includes a conventional reader/sorter which is shown in a dashed rectangle and will be referred to hereinafter as sorter 12 and a Missing Field Encoder which will be referred to hereinafter as MFE 13.

The sorter 12 (FIGS. 1A and 1B) includes a document track 14 having a plurality of sorting pockets therein such as pockets 16, 18, 20, 22 and 23. In the system 10, a "batch" of documents to be processed (such as 200-300 for example, in a batch) is placed in a stack 24 next to the track 14, and a conventional feed mechanism 26 is used to pick a document like 28 from the stack 24 and transfer it to the track 14 where a transport mechanism 30 associated with the feed mechanism 26 moves the document at a constant velocity along the track 14.

Figure 2:
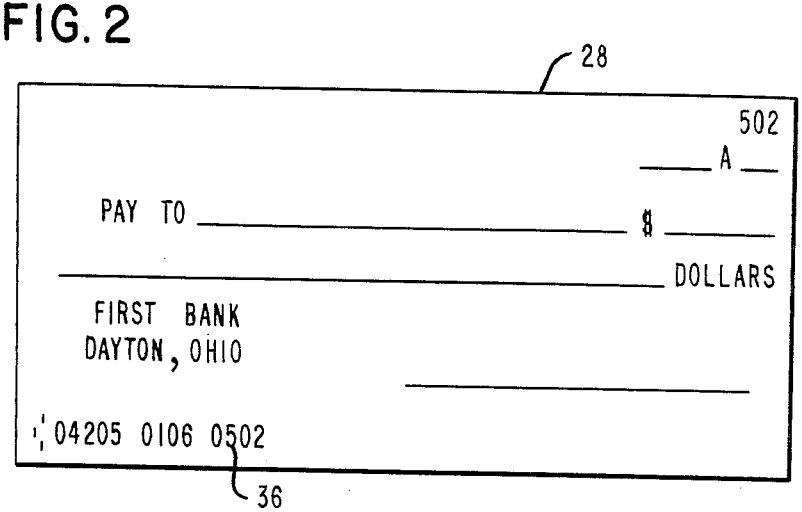
FIG. 2 is a plan view of a document such as a check which is processed by the system shown in FIGS. 1A and 1B.

In the embodiment described, the documents like 28 are checks and deposit slips, for example, which are processed in "batches" as previously described. As each document 28 is moved along the track 14, it is brought into operative relationship with a conventional magnetic ink character recognition (MICR) reader 32 and/or a conventional optical character recognition (OCR) reader 34, which readers are positioned along the track 14. The reader 32 is positioned so as to read the MICR line 36 of data (FIG. 2) as the document 28 is moved thereby. The MICR line 36 may also be read optically by the OCR reader 34, which is positioned slightly downstream from the MICR reader 32 along the direction of travel shown by arrow 38. The OCR reader 34 could also be used to process rejects from non-MICR coded documents such as "remittance slips" which are printed generally in plain or non-magnetic inks. At this point, it should be recalled from the earlier discussion herein, that the MICR line 36 on a document 28 contains, for example, the identification of the associated bank and routing number, customer's account number, and the monetary amount of the check. As a batch of documents 28 is passed through the sorter 12, the MICR line 36 on each of the documents is read and the data read is utilized to sort the specific documents into the various sorter pockets 18-22, for example, with pocket 16 being the reject area or pocket for rejects of a first type, and with pocket 23 being the reject area or pocket for rejects of a second type. This aspect will be described hereinafter.

The sorter 12 has a conventional document diverting mechanism (shown diagrammatically as a diverter 40, 40-1, and 40-2) associated therewith for diverting the documents like 28 into the various pockets 16-23 mentioned. The diverters 40, 40-1, and 40-2 are controlled by a pocket controller 42 which receives its sorting instructions from a data application processor designated generally as 44 and shown in FIG. 1A. The application processor 44 utilizes the data read from the documents 28 in association with its application programs to provide the sorting instructions to the pocket controller 42.

The sorter 12 has conventional recognition circuits 46 (FIG. 1A) associated therewith, with circuit "A" or 46-1 being used for the MICR reader 32, and with circuit "B" or 46-2 being used for the OCR reader 34. The recognition circuits 46-1 and 46-2 interpret the data from their associated readers 32 and 34, respectively, and each produces a packet of information or data which will be described hereinafter. Separate packets of data may be sent to the data application processor 44 for use thereby, or a composite packet of data may be prepared by the recognition circuits 46 to be sent to the processor 44; however, for ease of illustration only a packet of data derived from the MICR reader 32 will be described hereinafter.

Continuing with the example being discussed, this packet of data is routed to the application processor 44 via a conventional communication node 50 associated with the sorter 12 and a conventional interface 52 associated with the application processor 44. The recognition circuits 46-1 and 46-2 also can determine whether or not the data read is complete with regard to predetermined criteria. For example, if the packet of data is supposed to contain 30 MICR characters for each document 28 passing along the track 14, and one or more of these characters is or are missing, the packet of data will be tagged with a conventional code to indicate that a particular character is missing and to indicate its location in the packet of data, for example.

The application processor 44 (FIG. 1A) which utilizes the packets of data from the recognition circuits 46-1 and 46-2 includes interfaces 52, 54, 56, and 58, read only memory (ROM) 60, random access memory (RAM) 62, a display such as a cathode ray tube (CRT) 64, a keyboard (KB) 66, a processor (MP) 68 and control and interface logic 70. The processing routines associated with the application processor 44 may reside in the ROM 60; however, the routines are loaded, more typically, in the RAM 62 from a disc or tape storage, for example, as part of a conventional start-up procedure. The CRT 64 is used to provide communication with an operator who uses the KB 66 to enter data or instructions. The control and interface logic 70 provides the interconnections among all the various components of the application processor 44 to enable it to function conventionally as an application processor.

At this point, it should be pointed out that the sorter 12 has its own conventional, host-sorter controller 72 (FIG. 1B) which controls the various components of the sorter 12 as is typically done. To simplify the drawing, individual control lines from the host-sorter controller 72 to its associated components such as the feed mechanism 26, for example, are not shown. The data application processor 44 performs functions associated with this invention, which functions will be described hereinafter.

Assume for the moment, that a stream of documents 28 from a batch is moving past the readers 32 and 34, and that all data read is complete and correct and is transferred to the application processor 44. As each document 28 is moved along the track 14 past the reader 32, for example, the associated packet of data associated with that document 28 is utilized by the application processor 44 to decide into which pocket (18-22) of the sorter 12 the document is to be diverted or sorted. The packet of data including, for example, account number, bank routing number, and monetary amount is then used by processor 44 along with its application programs to make a sort decision. This sort decision passes out the interface 54 to the pocket controller 42 which then actuates the appropriate diverter 40 to direct the document into the appropriate pocket 18-22. Various totals and proof/balance conditions for various groups of documents may also be calculated and stored as is done customarily in the reconciliation process.

But in actual practice, documents 28 are not all read and sorted routinely as described in the previous paragraph; there are document rejects which are not read correctly or completely, which shall be referred to hereinafter as Type #1 Rejects, and there are also a few documents 28 on which the monetary amount of the document is completely missing, which shall be referred to hereinafter as Type #2 Rejects. The Type #2 Rejects which have their monetary fields completely missing will be directed through the MFE module 13 to have the monetary amount encoded thereon. This aspect will be discussed hereinafter.

To assist in facilitating the re-entry and repair of rejected documents, the system 10 utilizes an imaging apparatus including an imaging device 73. The imaging device 73 may be conventional and is shown in schematic form in FIG. 1A and in more detail in FIG. 3. The imaging device 73 is positioned downstream from MICR and OCR readers 32 and 34 and is positioned in operative relationship with a document 28 as it is moved in the track 14 past the imaging device 73. The imaging device 73 includes a glass window 74 which is positioned on a sidewall 14-1 of the track 14 to enable light from the light sources 76 and 78 to be directed by the associated light guides 80 and 82, respectively, on to a scanning line 84. The scanning line 84 is shown as a point in FIG. 3, because FIG. 3 represents a top or plan view of the track 14.

Figure 3:
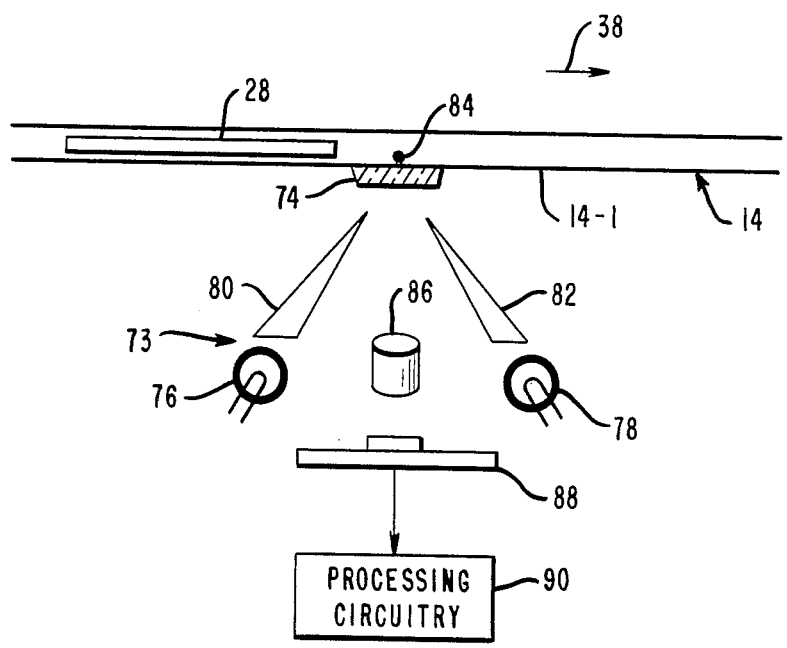
FIG. 3 is a plan view, similar to FIG. 1A, showing additional details of an imaging device shown in FIG. 1A.

The top, long edge of the document 28 is viewed in FIG. 3, and in normal operation, the document is moved on its lower, long edge, with the front of the document 28 facing the imaging device 73 as it is moved thereby; the scanning line in this environment is oriented in a vertical direction. As a document 28 is moved past the scanning line 84, the right-most edge of the document 28 (as viewed in FIG. 3) is illuminated by the sources of light 76 and 78, and light reflected therefrom through the window 74 is focused by a suitable lens system 86 on to the imaging sensor array 88. In the embodiment described, the array 88 may be of a type which produces a fixed number of picture elements or pixels along the scanning line 84. One such array 88, such as RL-1024B which is manufactured by Reticon Corporation, for example, produces 1024 pixels along the scanning line 84, although only 640 pixels are utilized to meet the resolution requirements of the embodiment described herein. As the document 28 is moved in the downstream direction shown by arrow 38, a new area of the document is presented to the scanning line 84 which produces a new set of 640 pixels therealong. Each pixel from the sensor array 88 has an associated analog, gray-scale value which is converted or digitized by the processing circuitry 90 to produce, for example, a six bit byte of data for each pixel, thereby recording 64 shades of gray ranging from white to black. As the scans are completed, a stream of bytes of data is issued from the processing circuitry 90. Because this aspect is conventional, it need not be described in any further detail.

The stream of bytes of data or pixels from the scanning line 84 (FIG. 3) of the "image" of a document 28 is further processed by having the output of the processing circuitry 90 fed into an enhancer 92, whose output, in turn, is fed into a compressor 94. The enhancer 92 is conventional and is a circuit which is used to eliminate unnecessary background information and to make the pertinent data stand out from background information, for example. The compressor 94 is a conventional circuit which receives the enhanced data from the enhancer 92 and eliminates that data which is "meaningless" or redundant and thereby "compresses" the remaining data to produce compressed, digitized-image data which reduces the amount of transmission time necessary to transmit the data associated with an image of a document 28 and which also reduces memory storage requirements. The output of the compressor 94 is fed to a conventional communication node 96 (FIG. 1B) whose output is coupled to an interface 98 which is part of an image data selector switch 100. The selector switch 100 is part of a means 102 (FIG. 1B) for completing data associated with a document 28 which is rejected; this aspect will be covered in detail hereinafter.

For the moment, it is sufficient to state that the imaging device 73 records the image of each document 28 passing thereby; however, if the packet of data about a document 28 is complete as read by the MICR reader 32, for example, the image data associated with this document is purged or eliminated. If the packet of data about a document 28 is incomplete as read by the MICR reader 32, for example, the image data associated with this document is retained so as to facilitate completion of the data by the means 102 (FIG. 1B) for completing data which will be described hereinafter.

Continuing with the example for which the data read from each document 28 is complete, each of the associated packets of data from the recognition circuits 46 is forwarded serially to the data application processor 44 (FIG 1B) via the communication node 50 and the interface 52. The data application processor 44, through its control and interface logic 70 and the interface 58, forwards each of the packets of data to a memory storage or a data capture file 104. The packets of data are placed sequentially in the file 104 as shown schematically in FIG. 4. For example, the solid line 106 represents a complete packet of data for a first document 28, and the dashed line 108 represents an incomplete packet of data for the next document 28 moved along the track 14 as determined by the recognition circuits 46.

Dashed line 108 (FIG. 4) represents the first, rejected document 28, and dashed line 110 represents the second, rejected document from the stack 24 in the example described. As earlier stated, the packet of data is tagged or flagged by the recognition circuits 46 in a way which indicates the "character or characters" which are missing or unreadable for the Type #1 Rejects earlier described herein, and the packet is tagged or flagged in a way which indicates that the entire monetary amount is missing for the Type #2 Rejects. Type #1 Rejects will be diverted into reject pocket 16 by diverter 40-1, and Type #2 Rejects will be diverted into pocket 23 by diverter 40-2.

Figure 4:
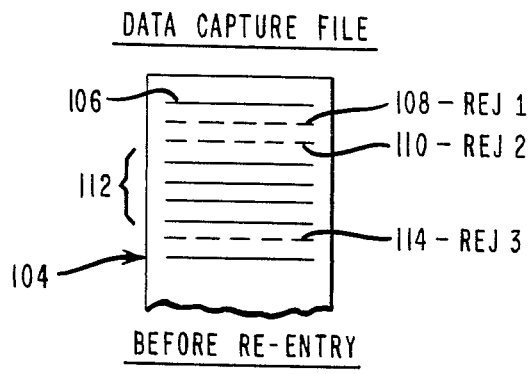
FIG. 4 is a schematic diagram of the data capture file shown in FIG. 1A to show the organization of the packets of data therein.

Following the packet of data for reject #2 (dashed line 110), there are several lines grouped in bracket 112 (FIG. 4) to represent packets of data which are complete, and dashed line 114 represents an incomplete packet of data for the third rejected document 28 or reject #3. The documents 28 corresponding to the packets of data which are complete and shown by line 106 and bracket 112 are sorted into the appropriate pockets 18-22 (FIG. 1B) according to the particular application program associated with the application processor 44, and the documents 28 corresponding to the packets of data which are associated with documents 28 of Types #1 and #2 Rejects, as shown by dashed lines 108, 110, and 114 in FIG. 4 are routed to the reject pockets 16 and 23, respectively. While the application program for controlling the sorting of the documents 28 may reside in the ROM 60° of the data application processor 44, it is loaded, typically, from a disc unit or a tape cassette (not shown), for example, into the RAM 62 (FIG. 1B). The KB 66 on the data application processor 44 may be used to initiate or control the loading of the application program or programs. The sorting instructions from the application program being used are routed from the application processor 44 through its interface 54 to the pocket controller 42 of the sorter 12 as previously explained.

It should be pointed out that due to the speed of the documents 28 being moved along the document track 14, a particular document 28, after moving past the MICR and OCR readers 32 and 34, will have been moved past the imaging device 73 before its status with regard to its data read being complete or Type #1 or Type #2 Rejects is determined. Accordingly, the images of all documents 28 passing along the track 14 are obtained and routed to the image data selector switch 100 via the communication node 96 as previously mentioned.

The data selection switch 100 (FIG. 1B) is conventional and may include standard CMOS integrated cross-point, selector switches such as those manufactured by RCA Corporation, for example. The switch 100 also includes a memory or image buffer 116 which functions on a first-in, first-out or FIFO basis, with each section like section #1, #2 through N being used to store data representing a compressed image of a document 28. The switch 100 is controlled by a data re-entry processor which is designated generally as 118 (FIG. 1A), and this processor 118 is operatively coupled to the data application processor 44 and the data selector switch 100 to facilitate the completing of data at the means 102 for completing data (FIG. 1B) as will be described later herein.

The re-entry processor 118 (FIG. 1A) includes the two-way interface 120 by which the re-entry processor 118 communicates with the data application processor 44, an interface 122 by which the re-entry processor 118 transfers data to the switch 100 via its associated interface 124, and an interface 126 which is a two-way interface between the re-entry processor 118 and a plurality of data entry terminals such as 128 and 130 which are part of the means 102 for completing data. The re-entry processor 118 also includes a control and interface logic 132, ROM 134, RAM 136 and MP 138 which are conventionally organized as shown.

It should be recalled that the application processor 44 sends instructions to the pocket controller 42 to control the disposition of the documents 28 into the various sorter pockets 16-23. Those documents 28 having a complete packet of data are sorted in pockets 18-22, for example, and those documents 28 which are classed as Type #1 Rejects and Type #2 Rejects are routed to the reject pockets 16 and 23, respectively. At the same time that the sorting data is sent to the pocket controller 42, the status of each of the packets of data, i.e., whether complete or Type #1 Reject or Type #2 Reject, is sent from the data application processor 44 to the re-entry processor 118 via the interface 120. For example, from the packets of data in the data file 104 in FIG. 4, an indication that the packet of data (line 106) is complete is forwarded to the re-entry processor 118, and the first and second partially completed packets of data (lines 108 and 110) are forwarded to the re-entry processor 118 as rejects #1 and #2 and stored, for example, in the RAM 136. While processing is being effected by the data application processor 44, the digitized image data resulting from the imaging device 73 is forwarded to the image buffer 116 (FIG. 1B) as previously explained. For example, compressed, image data for the first document 28 in the stack 24 may be positioned in the location #1 in the image buffer 116, and compressed, image data for the second document 28 is placed in location #2 in the image buffer 116, etc. In the example described, the image data in location #2 in the image buffer 116 corresponds to the first reject document whose packet of data is incomplete in the data capture file 104 (FIG. 4) and is represented by line 108 therein. Shortly after the documents 28 have passed the MICR and OCR readers 32 and 34, and the imaging device 73, the data application processor 44 will have received the complete/incomplete status (and Type #1 Reject and Type #2 statuses) with regard to the MICR line of data, for example. This status data is forwarded from the data application processor 44 to the re-entry processor 118 via interfaces 56 and 120 as previously mentioned. Using this status data, the re-entry processor 118 makes a decision to purge or retain, respectively, the compressed image data in the image buffer 116 for the corresponding document 28. Based on typical, sorter-reject rates, approximately 2% of the "images" of the documents 28 will be retained in the image buffer 116 because they will correspond to rejected documents.

These images of the rejected documents 28 remain in the image buffer 116 (FIG. 1B) only as long as it takes one of the data entry terminals like 128 and 130 to become available. Terminal 130 is identical to terminal 128; therefore, a description of only terminal 128 will be given.

The terminal 128 (FIG. 1B) is a conventional, semi-intelligent device which includes a display such as a high-resolution, cathode-ray tube (CRT) 140 and an entry keyboard (KB) 142. The terminal 128 also includes an interface 144 for receiving compressed image data from the selector switch 100, a decompressor 146 for decompressing the image data to enable it to be viewed on the CRT 140, a bi-directional interface 148 for receiving data from the re-entry processor 118 and for sending data thereto, a ROM 150, a RAM 152, a MP 154, and interface and control logic 156 for interconnecting, conventionally, the various components included in the terminal 128.

Figure 5:
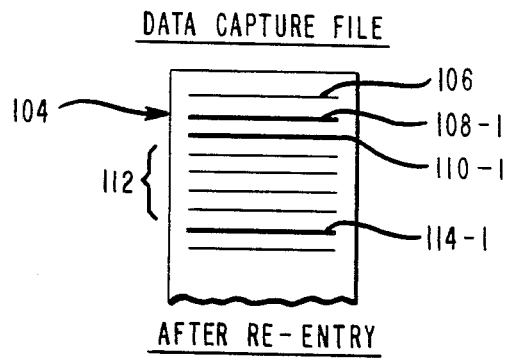
FIG. 5 is a schematic diagram similar to FIG. 4, showing re-entered data.

Continuing with the example given, if terminal 128 is available, the compressed image data in location #2 of the image buffer 116 (for the first rejected document 28) is forwarded to the terminal 128 via the interface 144, and thereafter it is decompressed by the decompressor 146 for viewing on the CRT 140. The reentry processor 118, at this time, also forwards the corresponding line 108 (FIG. 4) of incomplete data to the terminal 128 via the interface 148. This line 108 of incomplete data is also displayed on the CRT 140 to indicate to the operator of the terminal 128 what has been obtained previously via the MICR reader 32, for example. The re-entry processor 118 has sufficient conventional routines located in either the ROM 134 or RAM 136, for example, to correlate a line of incomplete data like line 108 with the corresponding compressed image data (like reject #1 in location #2 of the image buffer 116) and have them delivered to the CRT 140 for viewing by an operator. In addition, the re-entry processor 118 may highlight the missing character or characters on the line of incomplete data like 108 by pointing to it or to them with an arrow, for example, on the CRT 140. The operator then looks at the image of the document 28 on the CRT 140 and enters on the KB 142 the missing data. When the missing data is entered completely, the operator then actuates a transfer key 158 on the KB 142 to transfer the completed line 108-1 of data via the interface 148, the re-entry processor 118, the application processor 44 and the interface 58 to the data capture file 104 and a document re-entry file 158 (FIG. 1A). FIG. 5 shows the data capture file 104 after re-entry, with the now-completed line 108-1 of data in the location where the corresponding, partially-completed line 108 of data existed in FIG. 4. Note that the line 106 of data and those lines of data included in bracket 112 which were initially complete remain as complete lines of data in their original locations.

Figure 6:
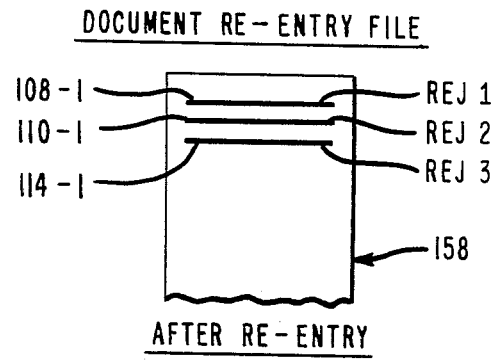
FIG. 6 is a schematic diagram of the document re-entry file shown in FIG. 1A, showing the organization thereof.

The document re-entry file 158, having the organization shown in FIG. 6, contains the completed lines of data for those documents 28 which were rejected initially as having incomplete lines of data for Type #1 and Type #2 Rejects. In the example being described, only the line 108-1 of now-completed line 108-1 would be added to the file 158 at this time.

After the successful re-entry of data associated with the line 108-1 of data as described, the data entry terminal 128, which handled the transaction, is purged of the data associated with that document. Also with regard to purging, as soon as the compressed image data from location #2 of the image buffer 116 is sent to entry terminal 128 for the completing of the line 108 of data already described, the location #2 in the image buffer 116 is "purged" of data, or stated another way, the location #2 becomes available to be overwritten with compressed, digitized data for another rejected document 28. Because location #1 of image buffer 116 relates to a document 28 having complete data, it would also be purged.

During the time that an operator is completing the line 108 of data just described, a second operator at the entry terminal 130 (FIG. 1B) receives the compressed, digitized data from location #3 in the image buffer 116; it should be recalled that in the example described, location #3 now contains the line 110 of data associated with the second reject #2 as seen from FIG. 4. The operator at terminal 130 then completes the data for line 110 as described in relation to terminal 128. After the line 110 (FIG. 4) of incomplete data is completed as discussed in relation to line 108, it becomes completed line 110-1 of data which is transferred to and is located in the data capture file 104 and the document re-entry file 158 as shown in FIGS. 5 and 6, respectively. The terminal 130 is then purged of the data associated with the line 110 and the associated image data and is ready to receive data associated with the next rejected document 28. This process is repeated until all the documents 28 in the stack 24 have been processed by the sorter 12.

To summarize, those documents 28 which are complete and are read routinely by the MICR and OCR readers 32 and 34 of the sorter 12 are sorted into the appropriate pockets 18-22 according to application programs associated with the data application processor 44. Those documents 28 for which the data read is incomplete as represented by Types #1 and #2 Rejects are located in the reject pockets 16 and 23, respectively. The re-entered or completed data for these rejected documents is obtained in connection with the data entry terminals 128 and 130, for example, and this completed data is transferred to the data capture file 104. This completed data is used to create the document re-entry file 158 (FIG. 6) which, in effect, is a listing of the rejected documents 28 which physically are located in the same order in the reject pockets 16 and 23 of the sorter 12.

It should also be noted that as the Type #2 Rejects are being diverted into the reject pocket 23, the MFE module 13 is utilized to encode the monetary amount on these rejects as soon as the data is completed at terminals 128 and 130. The Type #1 Rejects in reject pocket 16, which have incomplete data thereon, remain in the pocket 16 until the batch of documents is completely processed through the sorter 12.

Figure 7:
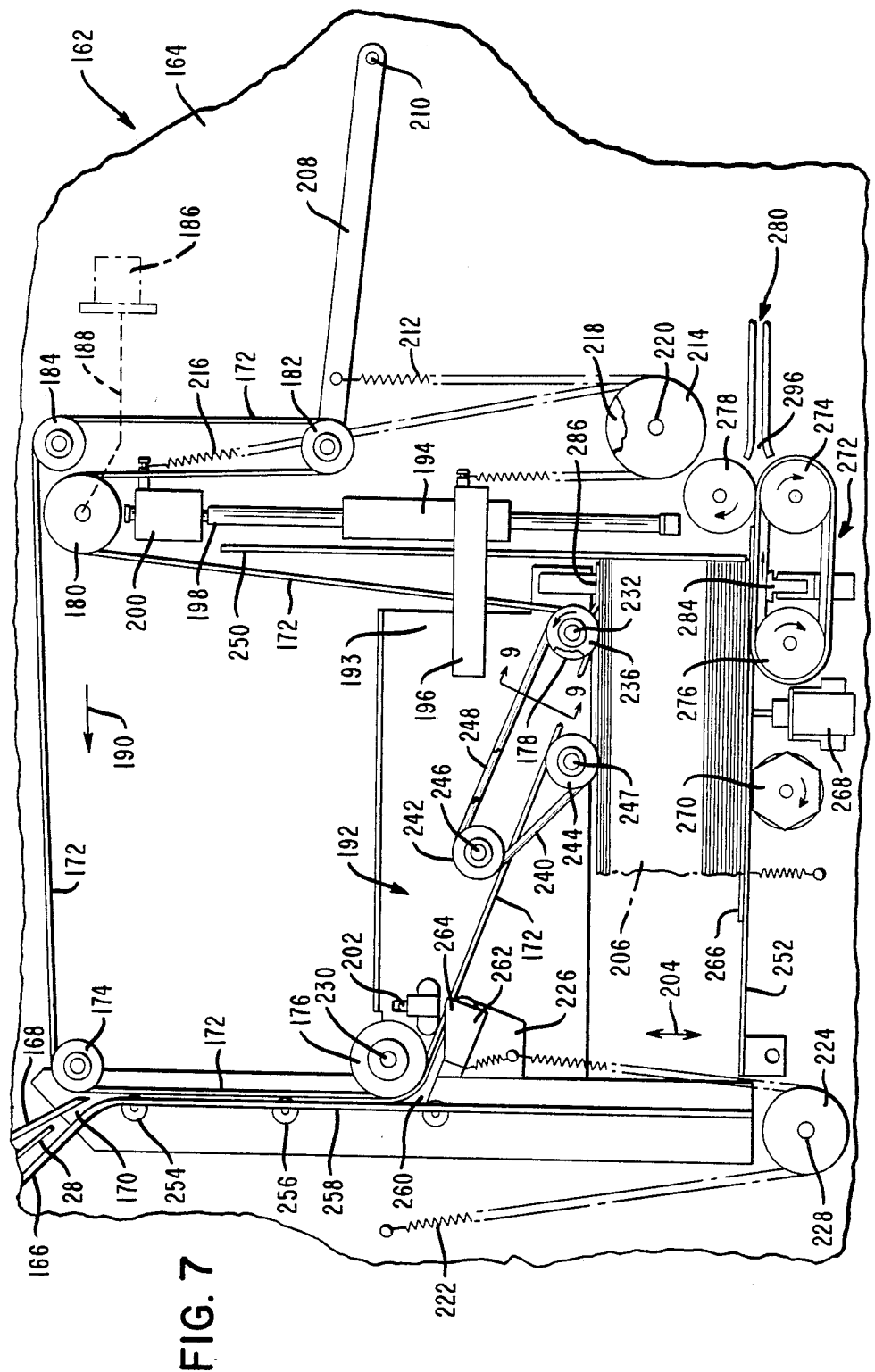
FIG. 7 is a plan view of a portion of the Missing Field Module shown in FIG 1B, showing a document storing or buffering device.

The MFE module 13 is shown in more detail in FIGS. 7 and 8, and the module 13 includes a means for buffering the flow of documents 28 from the sorter 12 to the encoder 160 and for storing them, with this means being referred to hereinafter as buffer 162. Any conventional means for buffering may be used.

The buffer 162 (FIG. 7) has a support plate 64 which is positioned in a horizontal plane in the embodiment described. A converging track composed of side walls 166 and 168, upstanding from the support plate 164, is used to direct a document 28 from the reject pocket 23 (FIG. 1B) to the entrance area 170 of the buffer 162. The buffer 162 also includes a wide, endless belt 172 which is mounted on pulleys 174, 176, 178, 180, 182 and 184 as shown, with pulley 180, for example, being driven by motor 186 (by conventional drive means 188) to move the belt 172 in the direction of arrow 190. Pulleys 174 and 184 are rotatably mounted on rods which are perpendicularly upstanding from the support plate 164 while pulleys 176 and 178 are mounted on a generally-rectangular, moveable plate 192. The moveable plate 192 is secured at one side 193 to a linear or sleeve bearing 194 by an arm or bracket 196. The sleeve bearing 194 is slidably mounted on a rod 198 having one end fixed to a mounting block 200 which is secured to the support plate 164. The side of moveable plate 192 opposite to side 193 has a rotatable wheel 202, depending from the lower side thereof, to enable the moveable plate 192 to be supported and reciprocated along the directions shown by double arrow 204. The moveable plate 192 is moved along the directions of double arrow 204 to accommodate varying amounts of documents 28 which are stored in the document stack 206. In this regard, pulley 182 is rotatably mounted on one end of an arm 208 whose remaining end is pivotally supported on a rod 210 upstanding from the support plate 164. A tension-type spring 212, having one end secured to the arm 208, passing around upper pulley 214, and having the remaining end secured to the bracket 196 keeps the tension on the belt 172 relatively constant as the size of the document stack 206 changes, due, for example, to documents entering the stack 206 at a rate faster or slower than they are withdrawn therefrom. A second, tension-type spring 216, having one end secured to the mounting block 200, passing around lower pulley 218, and having the remaining end secured to bracket 196 maintains a bias on the stack 206 to urge it in a direction towards the bottom of FIG. 7. The pulleys 214 and 218 are rotatably mounted on a rod 220 which is perpendicularly upstanding from the support plate 164. A third tension spring 222, having one end secured to the support plate 164, passing around pulley 224, and having the remaining end secured to a block 226, which in turn is secured to the moveable plate 192, maintains an equalizing bias on the left side (as viewed in FIG. 7) of moveable plate 192 to enable the sleeve bearing 194 to slide freely on the rod 198. Pulley 224 is rotatably mounted on a rod 228 which is perpendicularly upstanding from support plate 164.

As previously mentioned, the moveable plate 192 (FIG. 7) is utilized to accommodate the varying amounts of documents 28 in the stack 206. The pulley 176 is rotatably mounted on rod 230 which is perpendicularly upstanding from the moveable plate 192.

Figure 9:
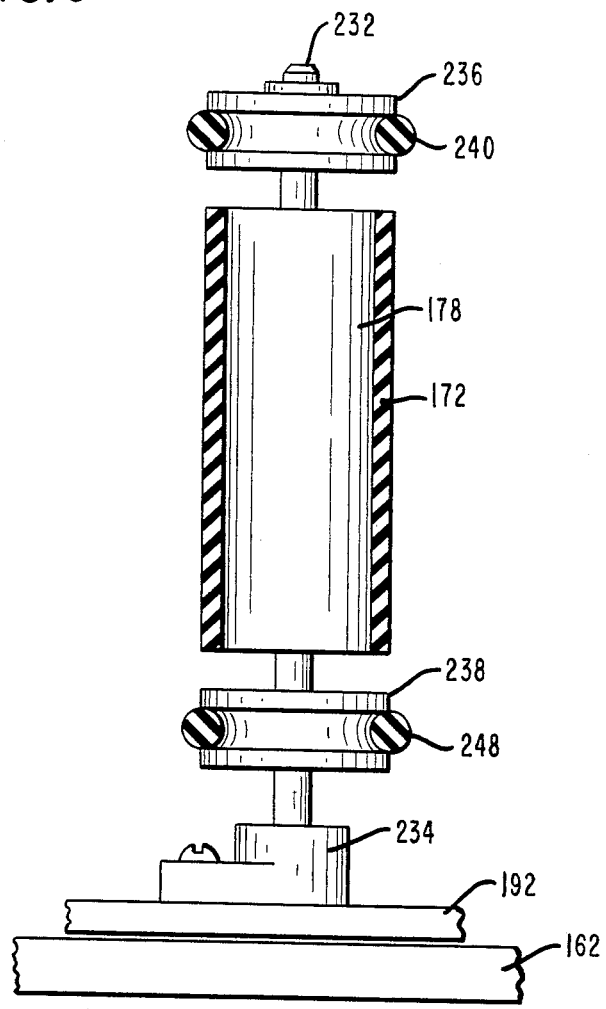
FIG. 9 is a cross-sectional view taken along the line 9—9 of FIG. 7 to show additional means for mounting and driving certain belts shown in FIG. 7.

Pulley 178 (FIG. 7) is actually a cylindrically-shaped pulley which is fixed to shaft 232 to rotate therewith as is seen best in FIG. 9. The shaft 232 has one end which is rotatably mounted and retained in a bearing 234 which is secured to the moveable plate 192. An upper roller 236 and a lower roller 238 are mounted on opposed sides of roller 178 and are fixed to the shaft 232 to be rotated thereby whenever the roller 178 is rotated. An "O"-ring-type, endless belt 240 is mounted on the pulley 236, on pulley 242, and on pulley 244 in the general orientation shown in FIG. 7. Pulley 242 is rotatably mounted on a rod 246 which is upstanding from the moveable plate 192, and pulley 244 is similarly mounted on a rod 247. While only one pulley 242 and one pulley 244 are shown in FIG. 7, an additional pulley at each location is used to enable the endless belts 240 and 248 to be supported as shown in FIG. 9. The belt 172 lies between the endless belts 240 and 248 and is used to drive them in a direction which moves or aligns the documents 28 in the stack 206 towards the side wall 250 (FIG. 7). The two rollers like 244 and the rollers 236 and 238 along with endless belts 240 and 248 apply a resilient bias to the stack 206 to urge the stack towards the end wall 252. A suitable time-out circuit (not shown) could be used to shut off the motor 186 after a predetermined amount of elapsed time after a document 28 enters the entrance area 170 to minimize the "scrubbing" action by endless belts 240 and 248 on the documents 28 in the stack 206.

After a document 28 enters the entrance area 170 (FIG. 7), it is transported between the wide belt 172 and idler rollers like 254 and 256 which are rotatably supported in the side wall 258. A deflector plate 260, which is secured to the block 226 to move with the moveable plate 192, is used to deflect the documents 28 towards the endless belts 240 and 248. A document bowing member 262 is secured to the block 226 and has a finger end 264 which is located at a height equal to approximately half the height of a document 28 to bow the document 28 so as to put a concave bend along its height for the entire length of the document as it is moved thereby. The bowing of the document 28 "stiffens" it so that it can be extended without collapsing to contact the belts 240 and 248 and be moved by them into the stack 206.

The documents 28 in the stack 206 (FIG. 7) rest against a plate 266 which is under the control of a solenoid 268. The plate 266 is suitably apertured to enable a rotating "jogger" 270 to settle and adjust the documents 28 in the stack 206 and to enable a pick-off belt 272 to pick the first document 28 in the stack 206 when the solenoid 268, for example, is de-energized, thereby permitting the plate 266 and the stack 206 to move towards the end wall 252. When the solenoid 268 is energized, it moves the plate 266 and the stack 206 away from the pick-off belt 270 to prevent the feeding of documents 28 from stack. The pick-off belt 272 is mounted on rollers 274 and 276, and a stripper roller 278 prevents more than one document at a time from being withdrawn from the stack 206.

Figure 8:
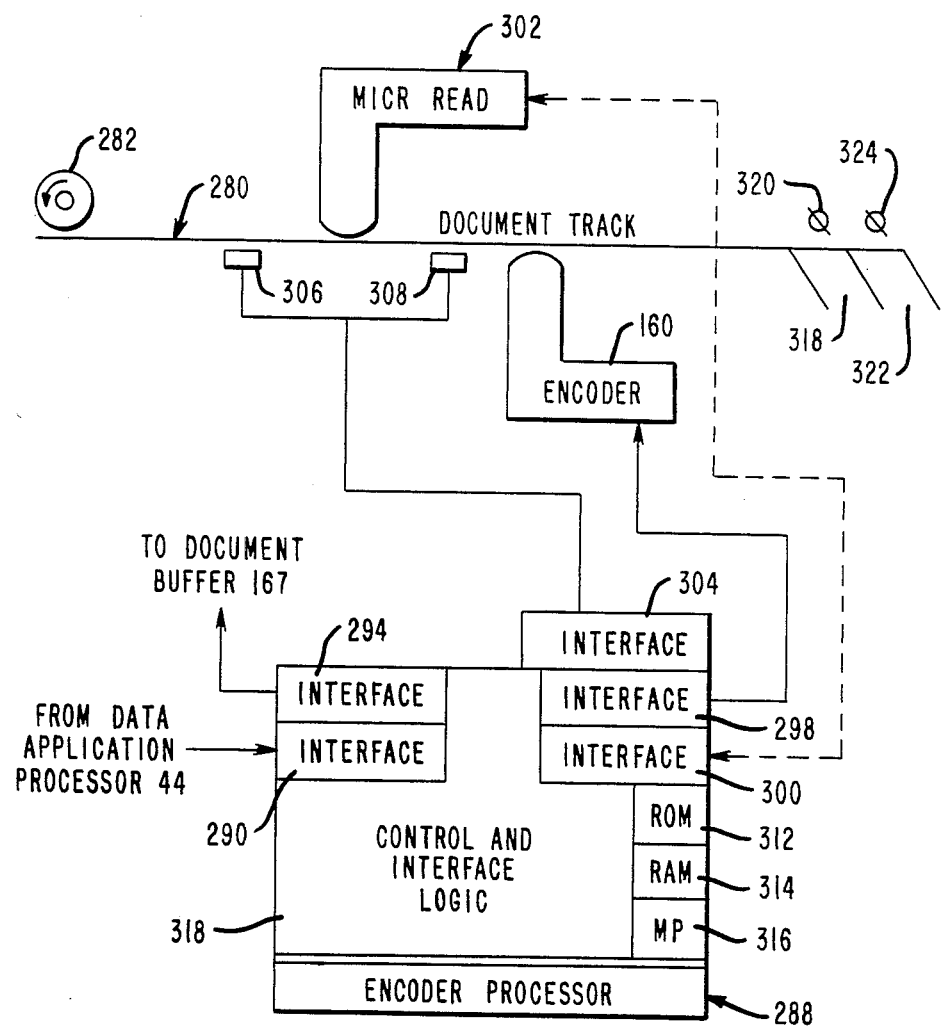
FIG. 8 is a schematic diagram showing the remaining portion of the Missing Field Module shown in FIG. 1B.

A document 28 which is picked from the stack 206 (FIG. 7) is moved into the document track 280, which is shown in schematic form in FIG. 8, where a suitable document drive means shown schematically as a roller 282 is used to move the documents along the track 280. The jogger 268, pick-off belt 272 and stripper roller 278 may be driven conventionally by suitable connecting means from motor 186, for example, or a separate motor (not shown) therefor may be provided. When there are no more documents 28 in the stack 206, a light and sensor combination 284, in cooperation with a reflective surface 286 secured to the moveable plate 192, is used to indicate this fact to the encoder processor 288 shown in FIG. 8. The encoder processor 288 controls the buffer 162 and the encoder 160 as will be described hereinafter.

The encoder processor 288 (FIG. 8) includes an interface 290 for coupling the encoder processor 288 with the interface 292 of the application processor 44 (FIG. 1A). The interface 294 (FIG. 8) represents collective interfaces for coupling the encoder processor 288 with the document buffer 162; these include the control of motor 186, the solenoid 268 and the pick-off belt 272, and the receiving of signals from various sensors (not shown) placed at various positions in the buffer 162, such as at entrance area 170 and exit area 296, to enable the buffer 162 to function in a conventional manner. The encoder processor 288 also includes an interface 298 for coupling the encoder 160 therewith and an interface 300 for coupling the processor 288 with an optional MICR reader 302. An additional interface 304 is utilized to couple the various document-position detectors 306 and 308, for example, with the encoder processor 288. The processor 288 also includes a ROM 312, RAM 314, and processor (MP) 316 which are all conventionally interconnected by the control and interface logic 318 to enable the encoder processor 288 to function as what is considered an "intelligent" terminal.

To summarize, the Type #2 Reject documents are diverted into the reject pocket 23 (FIG. 1B) in the order in which they appeared in stack 24 (FIG. 1A) and they accumulate in stack 206 in the buffer 162.

The means for completing data 102 (FIG. 1) is utilized to complete the data for the Type #1 and Type #2 Rejects, and the completed data for the rejected documents exists in the updated data capture file 104 (after re-entry or data completion as shown in FIG. 5) and/or in the document re-entry file 158. Because the completed data in the files 104 or 158 is in the same general order as was the order of documents in the stack 24, the matching of completed data with the corresponding physical document 28 from the stack 206 in the buffer 162 is simplified. It should also be noted that the data in the files 104 or 158 (FIG. 1A) is also tagged as being a Type #1 Reject or Type #2 Reject.

Assume that the data on line 108-1 in FIG. 6 of the re-entry file 158 is, for example, for a Type #2 Reject, which is now complete. The application processor 44 then forwards the data on line 108-1 from the file 158, via the application processor 44 (FIG. 1A) to the RAM 314 of the encoder processor 288 (FIG. 8). The processor 288 then "actuates" the solenoid 268 of the buffer 164 to enable the picker belt 272 to pick the first document 28 from the stack 206 to move the document towards the exit area 296 (FIG. 7) where it is picked up and moved by the document transport shown by roller 282 (FIG. 8) in the document track 280. The sensor 306 positioned along the track 280 detects the leading edge of the document 28 and indicates this fact to the encoder processor 288. If the optional MICR reader 302 is utilized, it would be energized to read the MICR line on the document and forward this read data to the encoder processor 288 which compares at least a portion of the just-read MICR data with that which is stored in the RAM 314 to make sure that the monetary amount to be printed or encoded on the document by the encoder 160 will be printed on the correct document 28. However, because the documents 28 remain in the same order as the corresponding data in the document re-entry file 158 (FIG. 1A) for example, the use of the MICR reader 302 is not absolutely necessary.

As the document 28 moves along the track 280, a second sensor 308 (FIG. 8) indicates that the leading edge of the document is approaching the conventional encoder 160 where the monetary amount from the encoder processor 288 is encoded or printed in MICR ink, for example, on the document. After encoding, the document 28 is deflected into a pocket 318 of completed or "repaired" documents by a deflector 320 under the control of the encoder processor 288. If, for some reason, the encoder processor 288 decides not to have the encoder 160 print the monetary amount on a document 28, as for example due to the data from the optional reader 302 not comparing favorably with the data obtained from the re-entry file 158, that particular document may be deflected into an optional reject pocket 322 by the deflector 324 which is also under the control of the encoder processor 288. The remaining documents 28 in the stack 206 are encoded in the same manner.

In order to complete the physical re-entry of the documents 28, those Type #1 Reject documents 28 which are in the reject pocket 16 (FIG. 1B) of the sorter 12 and the Type #2 Rejects which are in pockets 318 and 322 of the MFE module 13 (FIG. 8) are removed therefrom (but are kept in the same order) and are placed in a stack like 24 to be moved through the sorter 12 in a second pass therethrough. These rejected documents 28 are moved sequentially past the MICR and OCR readers 32 and 34 in an attempt to re-read them. There is a great probability that these rejected documents 28, again, will not be read completely; however, for whatever portion of data is read, a data matching attempt by the data application processor 44 can be made for that portion which is read to determine whether or not the rejected documents 28 are in the right order as they appear in the document re-entry file 158. While these documents 28 would normally be sorted into the reject pocket 16, for example, because the associated data read is incomplete, the completed data therefor now exists in the updated data capture file 104 (FIG. 5) and/or in the document re-entry file 158 (FIGS. 1A and 6), and this completed data is used by the data application processor 44 to instruct the pocket controller 42 to divert or sort the rejected documents 28 into the appropriate pockets 18-22, in the example described.

The completed data which exists in the data capture file 104 (FIGS. 1A and 5) may be used for the various reconciliation procedures such as balancing of totals, updating accounts, etc., usually encountered in the banking operations discussed earlier herein. Another feature of the system 10 is that the document re-entry file 158 may be used to provide a list of documents 28 having potential "mis-read" problems to banks which must handle the documents 28 in subsequent, routine, banking operations, i.e. the transit items.

Some additional general comments appear appropriate. A sorter 12 of the type selected to portray the preferred embodiment of this invention, may be, for example, of type #6780 which is manufactured by NCR Corporation of Dayton, Ohio. This sorter has a throughput of about 1400 documents per minute for documents having a length of about six inches. With a typical reject rate of 2% of the documents 28 having "incomplete" data, a maximum or worst reject rate of about twenty eight documents per minute can be anticipated. This reject rate is well within the capability of operators working at the data entry terminals 128, 130 in FIG. 1B. For example, proof-machine operators who key in the entire monetary amount fields have been measured at keying-rates of 65 documents per minute in a burst mode, and they can sustain rates of 25–35 documents per minute for a regular working day. Accordingly, a reject rate of 2% or about 28 documents per minute would appear to be handled quite readily with 2 data entry terminals like terminal 128.

Of the total of approximately 28 documents-per-minute, reject rate for Type #1 and Type #2 rejects as described herein, about 10% of the total relates to Type #2 rejects which have the monetary amount completely missing from the documents. This translates into 10% of 28 documents per minute or approximately 3 documents per minute for Type #2 rejects. A relatively slow, inexpensive encoder 160 handles this rate of Type #2 rejects.

We claim:

1. A document re-entry and repair system comprising:
    a reader/sorter having a reject pocket into which rejected documents are fed, said rejected documents meaning those documents which have the entire monetary amount missing thereon; and
    means for encoding data on said rejected documents, with said means for encoding data being connected to said reject pocket to receive said rejected documents from said reject pocket as said rejected documents are fed into said reject pocket by said reader/sorter to provide on-line encoding of said rejected documents.

2. The combination as claimed in claim 1 in which said means for encoding data includes a printer which prints data on said rejected documents while they are located at said means for encoding data.

3. The combination as claimed in claim 2 in which said means for encoding data includes means for supplying monetary amount data for each of said rejected documents to said printer to enable said printer to print the associated monetary amount data on each said rejected document.

4. The combination as claimed in claim 3 in which said printer is capable of printing in magnetic ink.

5. A document re-entry and repair apparatus for encoding a missing field on documents, comprising:
    means for reading said fields on said documents;
    means for moving said documents along a track in reading relationship with said means for reading to determine which of said documents has a said missing field;
    a reject pocket;
    means for diverting those of said documents having a said missing field into said reject pocket;
    means for developing data for said missing fields to produce completed data for each of said documents diverted into said reject pocket; and
    means for encoding data being located adjacent to said reject pocket for receiving documents as they are diverted into said reject pocket; said means for encoding data including an encoder which encodes said completed data from said means for developing data on the associated said document diverted into said reject pocket.

6. The apparatus as claimed in claim 5 in which said means for encoding data includes a means for storing said documents as they are received from said reject area and for delivering said documents to said encoder on a first-in, first-out basis, and in which said encoder is capable of encoding in magnetic ink.

7. A document re-entry and repair system comprising:
    a transport system having a track along which documents are fed sequentially in a feeding direction by an associated feed mechanism;
    reading means positioned at said track in operative relationship with said documents as they are fed along said track so as to read therefrom monetary data associated with each said document; said reading means including means to determine whether the data read from each said document is complete or incomplete with respect to predetermined criteria and to produce corresponding complete and incomplete signals, respectively;
    diverting means positioned along said track for diverting into a reject pocket those of said documents having a said incomplete signal associated therewith;
    processing means for processing said data read by said reading means and for controlling said diverting means;
    said processing means including:
    storing means for storing said data read from said documents and also for enabling said data read to be distinguished as complete or incomplete with regard to the associated documents;
    means for completing data for those documents having an incomplete signal associated therewith; and comprising:
    an imaging apparatus positioned along said track downstream along said feeding direction from said reading means to produce digitized image data of each said document passing thereby;
    data development means including a memory for storing said digitized image data, a display and a keyboard; and
    interface means for interfacing said processing means with said data development means to enable said data for a document having an incomplete signal associated therewith to be viewed on said display along with an image for said document derived from the associated digitized image data from said memory to enable an operator to key in additional data on said keyboard to thereby complete the data, forming completed data for said last-named document;
    said completed data being transferred from said data development means to said storing means via said interface means and said processing means upon actuation of a transfer key on said keyboard; and
    means for encoding data on said documents which have a said incomplete signal associated therewith, and which were diverted into said reject pocket, with said means for encoding data being connected to said reject pocket to receive said last name documents as they are divided into said reject pocket by said diverting means, and also with said means for encoding data being coupled to said storing means to receive said completed data for said documents being diverted into said reject pocket to enable said means for encoding data to encode the associated said completed data on the corresponding said document.

8. The system as claimed in claim 7 in which said means for encoding data includes a printer which prints the said completed data on the corresponding said document in magnetic ink.

9. The system as claimed in claim 8 in which said means for encoding data includes a means for storing said documents as they are received from said reject pocket and for delivering said documents to said printer on a first-in, first-out basis.

10. The system as claimed in claim 9 in which said completed data represents a monetary amount for said documents having an incomplete signal associated therewith.

11. A document re-entry method of repairing a missing data field on documents comprising:
(1) moving the documents along a track in reading relationship with a means for reading said documents to determine which of said documents has a said missing data field;
(2) diverting said documents having a said missing data field into a reject pocket;
(3) developing data for said missing data field to produce completed data for each of said documents diverted into said reject pocket without using said diverted documents;
(4) locating an encoder adjacent to said reject pocket for recieving said documents as they are diverted into said reject pocket in said diverting step to provide on line encoding of said rejected documents;
(5) encoding the corresponding completed data for each said document at said encoder as obtained from said developing step.

12. The method as claimed in claim 10 in which said encoding step is effected using magnetic ink.

13. A document re-entry method of repairing a completely missing field on documents comprising the steps of:
(1) moving the documents along a track in reading relationship with a reader;
(2) reading data from said documents during said moving step;
(3) deciding whether the data read in said reading step is complete or incomplete with regard to said missing data field;
(4) storing the data read from said documents in a memory and in a manner enabling the data read from said documents to be distinguished as complete or incomplete with regard to the associated documents;
(5) imaging said documents after said reading step while being moved along said track so as to produce digitized image data for each said document;
(6) diverting into a reject pocket those documents whose data read is incomplete;
(7) developing data for each of said documents whose data read from said reading step is incomplete by utilizing the associated data from said reading step and the associated digitized image data from said imaging step to produce completed data for the associated document; said developing step being intiated after said diverting step;
(8) storing said completed data in said memory;
(9) locating an encoder adjacent to said reject pocket for receiving said documents as they are diverted into said reject pocket in said diverting step;
(10) using said encoder to encode the associated said completed data as obtained from said memory for each of said documents from said reject pocket.

14. The method as claimed in claim 13 in which said encoding step is effected using magnetic ink.

* * * * *